United States Patent
Draijer

(10) Patent No.: US 7,058,379 B2
(45) Date of Patent: Jun. 6, 2006

(54) ORTHOGONAL FREQUENCY DIVISION MULTIPLEXING TRANSCEIVER AND METHOD OF OPERATING THE SAME

(75) Inventor: Gert Draijer, Apeldoorn (NL)

(73) Assignee: Agere Systems, Inc., Allentown, PA (US)

( * ) Notice: Subject to any disclaimer, the term of this patent is extended or adjusted under 35 U.S.C. 154(b) by 536 days.

(21) Appl. No.: 10/440,897

(22) Filed: May 19, 2003

(65) Prior Publication Data

US 2004/0235444 A1 Nov. 25, 2004

(51) Int. Cl.
*H04B 1/38* (2006.01)

(52) U.S. Cl. .................. 455/258; 455/255; 455/323; 375/328

(58) Field of Classification Search ............... 455/256, 455/255, 258, 260, 265, 323, 324; 375/132, 375/327, 328; 370/208, 345, 344, 482
See application file for complete search history.

(56) References Cited

U.S. PATENT DOCUMENTS

| 6,944,121 B1 * | 9/2005 | Weste et al. ............... 370/208 |
| 2002/0054627 A1 * | 5/2002 | Asikainen .................. 375/219 |
| 2004/0087279 A1 * | 5/2004 | Muschallik et al. .......... 455/73 |

* cited by examiner

*Primary Examiner*—Nguyen T. Vo
*Assistant Examiner*—Blane Jackson

(57) ABSTRACT

For use in an orthogonal frequency division multiplexing (OFDM) transceiver, a multimode local oscillator circuit and a method of operating the same. In one embodiment, the circuit includes: (1) a single sideband mixer having an output, first and second inputs and a local oscillator input and (2) a signal generator, coupled to the single sideband mixer, for alternatively providing to the first and second inputs: (2a) constant values to cause the single sideband mixer to generate a first receiver local oscillator signal for operating the OFDM transceiver as a zero intermediate frequency receiver and (2b) a first orthogonal baseband signal to cause the single sideband mixer to generate a second receiver local oscillator signal for operating the OFDM transceiver as a low intermediate frequency receiver.

21 Claims, 3 Drawing Sheets

ORTHOGONAL FREQUENCY DIVISION MULTIPLEXING TRANSCEIVER AND METHOD OF OPERATING THE SAME

TECHNICAL FIELD OF THE INVENTION

The present invention is directed, in general, to radio frequency transceivers and, more specifically, to an orthogonal frequency division multiplexing (OFDM) transceiver and method of operating the same.

BACKGROUND OF THE INVENTION

Society continues to move into an age of electronic information as the creation and exchange of electronic data steadily increases. Electronic data is increasingly used for such endeavors as work, education, entertainment and communication. As the use of electronic data increases and expands, so has demand for lower cost and higher performing electronic data devices.

Additionally, the demand for mobile electronic data devices has also increased. In addition to being a society of electronic data, society is also becoming more of a mobile society. Not only is there a demand for electronic data at home or work, but the mobile society also demands access to electronic data without the limit of wireline connections. For example, users want the ability to wirelessly use a laptop throughout their home but yet have access to electronic information as if using a desktop computer. Further, users want access to electronic data through cellular telephones or other mobile computing devices such as personal digital assistants (PDA).

Unfortunately, exchanging electronic data wirelessly presents such problems as interference, security, delay and quality. Several modulation methods have been developed to improved the wireless transfer of electronic data. One such method is orthogonal frequency division multiplexing (OFDM). OFDM is a method of wirelessly transmitting and receiving electronic data at a high data rate and low complexity even over hostile channels.

A preferred configuration for OFDM transceivers includes a direct conversion transmitter and a zero or low intermediate frequency (IF), receiver. A direct conversion transmitter transmits data at a carrier frequency provided by a clock, or more specifically, a local oscillator without using an intermediate frequency. Similarly, a zero intermediate frequency receiver is also known as a direct conversion receiver since it uses a local oscillator that coincides with an incoming carrier frequency giving an intermediate frequency of zero. A low intermediate frequency receiver, on the other hand, uses a mixer to convert the incoming carrier frequency signal to a lower fixed intermediate frequency for further processing. Typically, the mixer mixes a signal from a local oscillator with the incoming carrier frequency resulting in the intermediate frequency. The local oscillator usually operates at or near the incoming carrier frequency with the intermediate frequency being a difference between the local oscillator signal and a data signal frequency.

Though preferred, this OFDM configuration creates a difficult local oscillator (LO) design since a different LO frequency is needed for the transmit and receive modes. Typically, the frequency difference for the transmit and receive modes is the intermediate frequency.

The different LO frequencies for transmitting and receiving may be achieved by using a single voltage controlled oscillator (VCO) and a single frequency synthesizer that is reprogrammed during the transmit and receive modes. The frequency synthesizer may be a frequency divider. Unfortunately, the time needed to switch from one frequency to another is too great for the strict timing requirements required between the transmit and receive modes.

In another configuration, two VCO's and two frequency synthesizers may be used to produce the two required frequencies for transmitting and receiving. In this configuration, one combination of the VCO's and synthesizers may be used for one frequency and another combination of VCO's and synthesizers may be used for the other frequency. Though there is no timing problem as in the first configuration, this configuration may create an adverse output spectrum due to cross talk between the two VCO's.

Accordingly, what is needed in the art is a local oscillator capable of producing a clean signal and a fast switching signal for an OFDM transceiver.

SUMMARY OF THE INVENTION

To address the above-discussed deficiencies of the prior art, the present invention provides, for use in an OFDM transceiver, a multimode local oscillator circuit and a method of operating the same. In one embodiment, the circuit includes: (1) a single sideband mixer having an output, first and second inputs and a local oscillator input and (2) a signal generator, coupled to the single sideband mixer, for alternatively providing to the first and second inputs: (2a) constant values to cause the single sideband mixer to generate a first local oscillator signal for operating the OFDM transceiver as a zero intermediate frequency receiver and (2b) a first orthogonal baseband signal to cause the single sideband mixer to generate a second local oscillator signal for operating the OFDM transceiver as a low intermediate frequency receiver.

In one embodiment of the present invention, the signal generator will be transparent and allow transmit baseband signals to pass to the single sideband mixer to generate a transmit signal for operating the OFDM transceiver as a transmitter.

In one embodiment of the present invention, the single sideband mixer comprises first and second phase offset circuits, coupled to the local oscillator input, for generating first and second orthogonal local oscillator signals. The circuit may further include a mode switch, coupled to the output, for toggling the OFDM transceiver between receiver and transmitter modes. The OFDM transceiver and the multimode local oscillator circuit may advantageously be embodied in a single integrated circuit.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
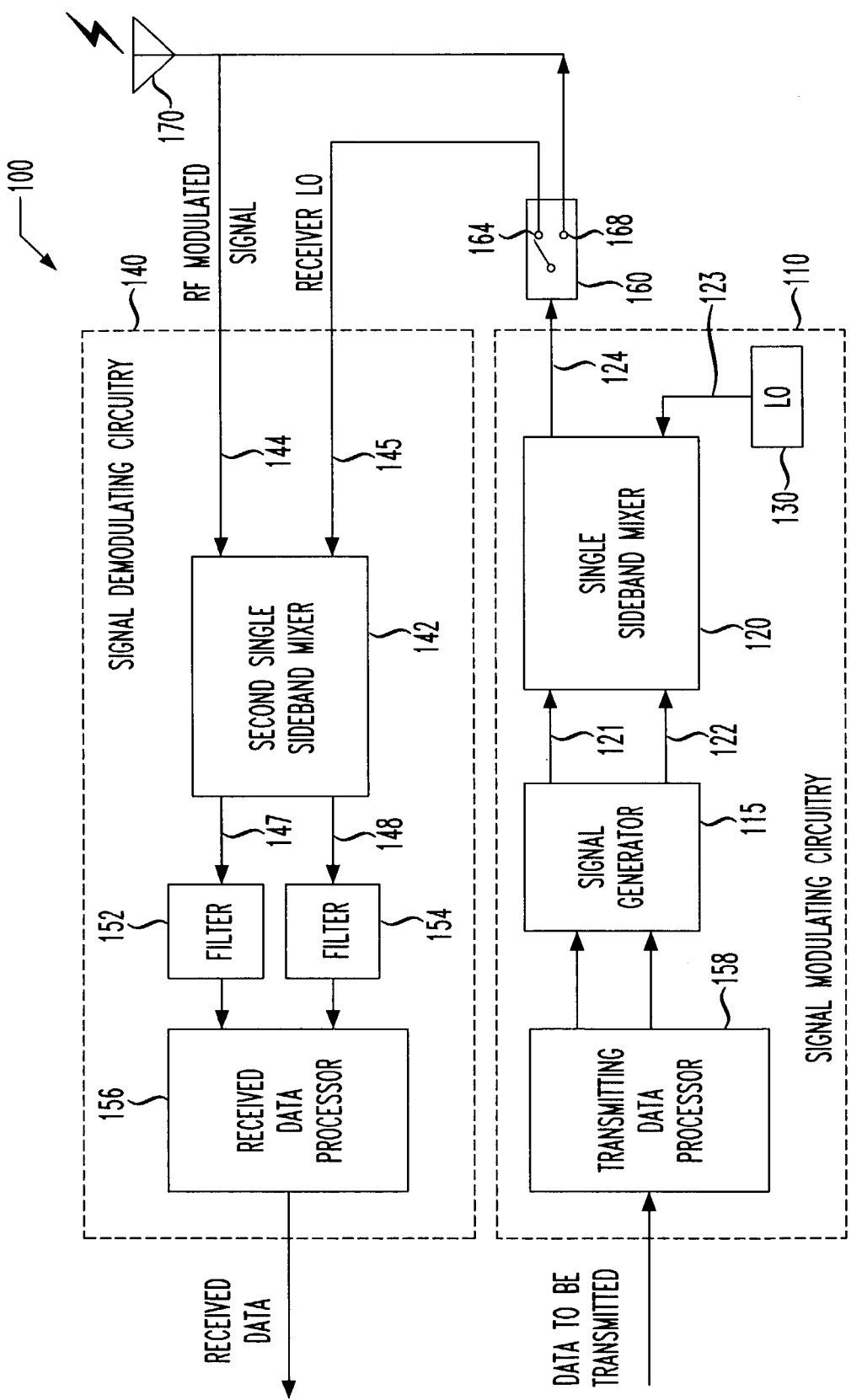
FIG. 1 illustrates a block diagram of an embodiment of an orthogonal frequency division multiplexing (OFDM) transceiver constructed in accordance with the principles of the present invention.

Referring initially to FIG. 1, illustrated is a block diagram of an embodiment of an orthogonal frequency division multiplexing (OFDM) transceiver, generally designated 100, constructed in accordance with the principles of the present invention. The OFDM transceiver 100 includes a signal modulating circuitry 110, a signal demodulating circuitry 140, a mode switch 160 and an antenna 170. The signal modulating circuitry 110 includes a signal generator 115, a single sideband mixer 120, a local oscillator 130 and a transmitting data processor 158. The single sideband mixer 120 includes first and second inputs 121, 122, a local oscillator input 123 and an output 124.

The signal demodulating circuitry 140 includes a second single sideband mixer 142, first and second filters 152, 154, and a received data processor 156. The second single sideband mixer 142 includes a data input 144, a receiver local oscillator input 145 and a first and second output 147, 148. The mode switch 160 includes a first position 164 and a second position 168.

The OFDM transceiver 100 may be a laptop computer, a PDA, a mobile telephone or another device capable of wirelessly transmitting and receiving data employing OFDM. The data may include, for example, text, voice or pictures. Preferably, the OFDM transceiver 100 may transmit data employing a direct-up transmitter architecture and receive data employing either a direct-down architecture, also known as a zero intermediate architecture, or a low intermediate architecture. In a preferred embodiment, the OFDM transceiver 100 and the signal modulating circuitry 110 may be embodied in a single integrated circuit.

The signal modulating circuitry 110 may be used as a multimode local oscillator circuitry in a receive mode. The signal modulating circuitry 110 may provide a local oscillator signal for receiving data. The signal modulating circuitry 110 may provide a first receiver local oscillator signal for operating the OFDM transceiver 100 as a zero intermediate frequency receiver and a second receiver local oscillator signal for operating the OFDM transceiver 100 as a low intermediate frequency receiver.

The signal generator 115 may be embodied within a digital signal processor (DSP). The signal generator 115 may provide values or signals to the single sideband mixer 120 for operating the OFDM transceiver 100 as a zero or low intermediate frequency receiver or as direct-up transmitter.

The single sideband mixer 120 may be a conventional single sideband mixer. The single sideband mixer 120 is coupled to the signal generator 115 via the first and second inputs 121, 122, and coupled to the local oscillator 130 via the local oscillator input 123. The single sideband mixer 120 is also coupled to the mode switch 160 via the output 124.

The signal demodulating circuitry 140 may be conventional circuitry typically employed within OFDM transceivers for processing data that is to be received. The signal demodulating circuitry 140 includes the second single sideband mixer 142 which may be a conventional single sideband mixer. The second single sideband mixer 142 may be coupled to the first and second filters 152, 154, via the first and second outputs 147, 148, and coupled to the mode switch 160 and the antenna 170 via the receiver local oscillator input 145 and the data input 144, respectively. The first and second filters 152, 154, may be conventional bandpass filters for the desired intermediate frequency or low pass filters when operating in a direct down mode.

The first and second filters 152, 154, may be coupled to the received data processor 156. The received data processor 156 may be conventional circuitry that demodulates and processes a received data signal from the antenna 170 to provide received data. The received data processor 156 may include such conventional components as a sampler, analog to digital converters, a demodulator and amplifiers.

The transmitting data processor 158 essentially functions opposite the received data processor 156. The transmitting data processor 158 may be conventional circuitry that processes and modulates data to be transmitted. The transmitting data processor 158 may include conventional components such as a vocoder, a modulator, digital to analog converters and low pass filters. In a preferred embodiment, the transmitting data processor 158 may be embodied in a digital signal processor.

The mode switch 160 may be a conventional analog switch capable of toggling between two positions. The mode switch 160 may be coupled to the antenna 170. The antenna 170 may be a conventional OFDM antenna capable of transmitting and receiving data. When in the transmit mode, the mode switch 160 is in the second position 168. When in the receive mode, the mode switch 160 is in the first position 164.

In the transmit mode, for example, the OFDM transceiver 100 may be a mobile telephone that receives speech data through a microphone as an input for wireless transmission. The transmitting data processor 158 may digitize and code the speech to create bits of information. The transmitting data processor 158 may also modulate the bits of information on a carrier frequency as an I and Q signals. The modulated information bits may be further processed by shaping filters and low pass filters before being sent to the signal generator 115.

The signal generator 115 may receive and send the I and Q signals to the single sideband mixer 120 via the first and second inputs 121, 122. The single sideband mixer 120 may direct convert the I and Q signals to a radio frequency for propagation via the antenna 170. Since the OFDM transceiver 100 is in the transmit mode, the antenna may receive the direct converted signal through second position 168 of the mode switch 160.

When in the receive mode, the mode switch 160 is in the first position and data is received by the second single sideband mixer 142 through the antenna 170 and the input 144. When in the first position 164, the mode switch 160 allows either a first or second receiver local oscillator signal to be provided to the second single sideband mixer 142 via the receiver local oscillator input 145. The OFDM transceiver 100 may advantageously operate as a zero intermediate receiver or as a low intermediate receiver. When operating as a zero intermediate receiver, the signal generator 115 may provide to the first and second inputs 121, 122, constant values causing the single sideband mixer 120 to generate the first receiver local oscillator signal. Alternatively, the signal generator 115 may provide to the first and second inputs 121, 122, a first orthogonal baseband signal causing the single sideband mixer 120 to generate the second receiver local oscillator signal for operating the OFDM transceiver 100 as a low intermediate receiver.

As a low intermediate receiver, the second single sideband mixer 142 employs the second receiver local oscillator signal to mix down the data received via the antenna 170 from a high frequency RF signal to a lower frequency typically referred to as an intermediate frequency. If the OFDM transceiver 100 is operating as a zero intermediate receiver, the second single sideband mixer 142 employs the first receiver local oscillator signal to mix down the received data to a intermediate frequency of zero Hz. One skilled in the art will understand the operation of a zero and low intermediate frequency receiver.

Figure 2:
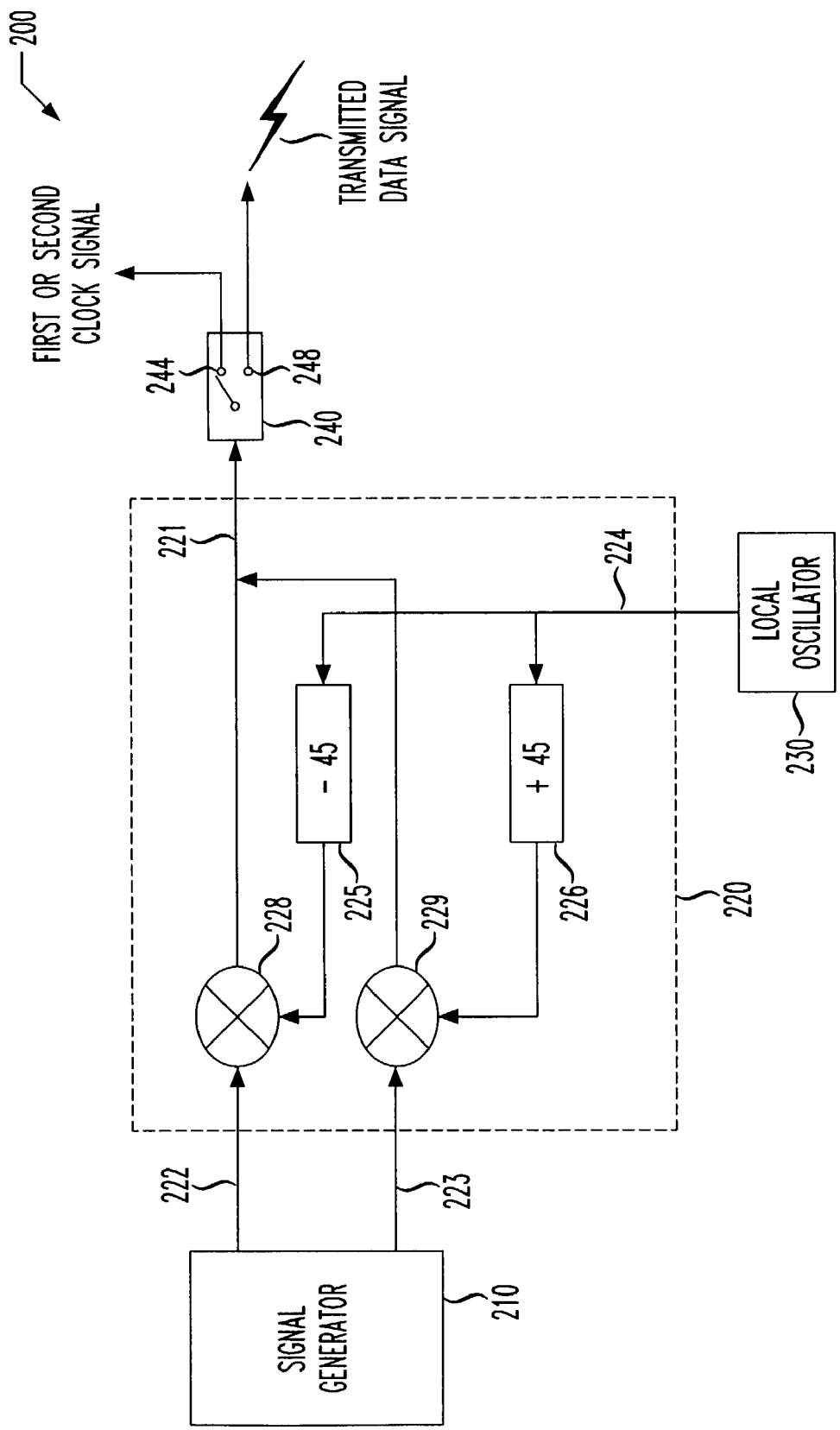
FIG. 2 illustrates a block diagram of an embodiment of a multimode local oscillator circuit constructed in accordance with the principles of the present invention.

Turning now to FIG. 2, illustrated is a block diagram of an embodiment of a multimode local oscillator circuit, generally designated 200, constructed in accordance with the principles of the present invention. The multimode local oscillator circuit 200 includes a signal generator 210, a first single sideband mixer 220, a local oscillator 230 and a mode switch 240. The single sideband mixer 220 includes an output 221, first and second inputs 222, 223, a local oscillator input 224, first and second phase offset circuits 225, 226, and a first and second mixer 228, 229.

The signal generator 210 may be embodied in a digital signal processor. The signal generator 210 may be coupled to the single sideband mixer 220 for alternatively providing to the first and second inputs 222, 223, constant values to cause the single sideband mixer 220 to generate a first local oscillator signal for operating an OFDM transceiver as a zero intermediate frequency receiver, and a first orthogonal baseband signal to cause the single sideband mixer 220 to generate a second local oscillator signal for operating the OFDM transceiver as a low intermediate frequency receiver.

Additionally, the signal generator may be by-passed and alternatively provide to the first and second inputs 222, 223, a second orthogonal baseband signal to cause the single sideband mixer 220 to generate a transmit signal for operating the OFDM transceiver as a transmitter.

The single sideband mixer 220 may be a conventional single sideband mixer. The first and second phase offset circuits 225, 226, may be coupled to the local oscillator input 224 to generate first and second orthogonal local oscillator signals. The first phase offset circuit 225 may produce a −45 degree component of the local oscillator input 224 from the local oscillator 230 whereas the second phase offset circuit 226 may produce a +45 degree component of the local oscillator input. The first and second mixers 228, 229, may be typical mixers. The local oscillator 230 and the multimode switch 240 may be a conventional oscillator and multimode switch. The 230 mode switch, coupled to the output 221, may be employed to toggle an OFDM transceiver between receiver and transmitter modes.

To generate the first local oscillator signal, the signal generator 210 may send a continuous high value ("1") through the first input 222 and a continuous low value ("0") through the second input 223 to the first and second mixers 228, 229. The first mixer 228 may mix the continuous high value with the −45 degree component and the second mixer 229 may mix the continuous low value with the +45 degree component resulting in the selection of the −45 degree component as the first local oscillator signal at the output 221. With the multimode switch 240 in the first position 244, the first local oscillator signal may be used to operate an OFDM transceiver as a zero intermediate frequency receiver.

To generate the second local oscillator signal, the signal generator 210 may send a first orthogonal baseband signal through the first and second inputs 222, 223, to the first and second mixers 228, 229. The signal generator 210 may send the I signal component of the first orthogonal baseband signal through the first input 222 and the Q signal component through the second input 223. The first and second mixers 228, 229, may mix the I and Q signal components with the −45 degree and +45 degree components of the local oscillator input 224 resulting in the second local oscillator signal at the output 221. With the multimode switch 240 in the first position 244, then the second local oscillator signal may be used to operate an OFDM transceiver as a low intermediate frequency receiver.

The signal generator 210 alternatively may provide to the first and second inputs 222, 223, a second orthogonal baseband signal to cause the single sideband mixer 220 to generate a transmit signal for operating an OFDM transceiver as a transmitter. When providing the second orthogonal baseband signal, the multimode switch 240 is in the second position 248 and the second orthogonal baseband signal is data to be transmitted. In this situation, the I and Q components of the second orthogonal baseband signal is mixed with the −45 and +45 degree components of the local oscillator input 224 for propagation through an antenna.

Figure 3:
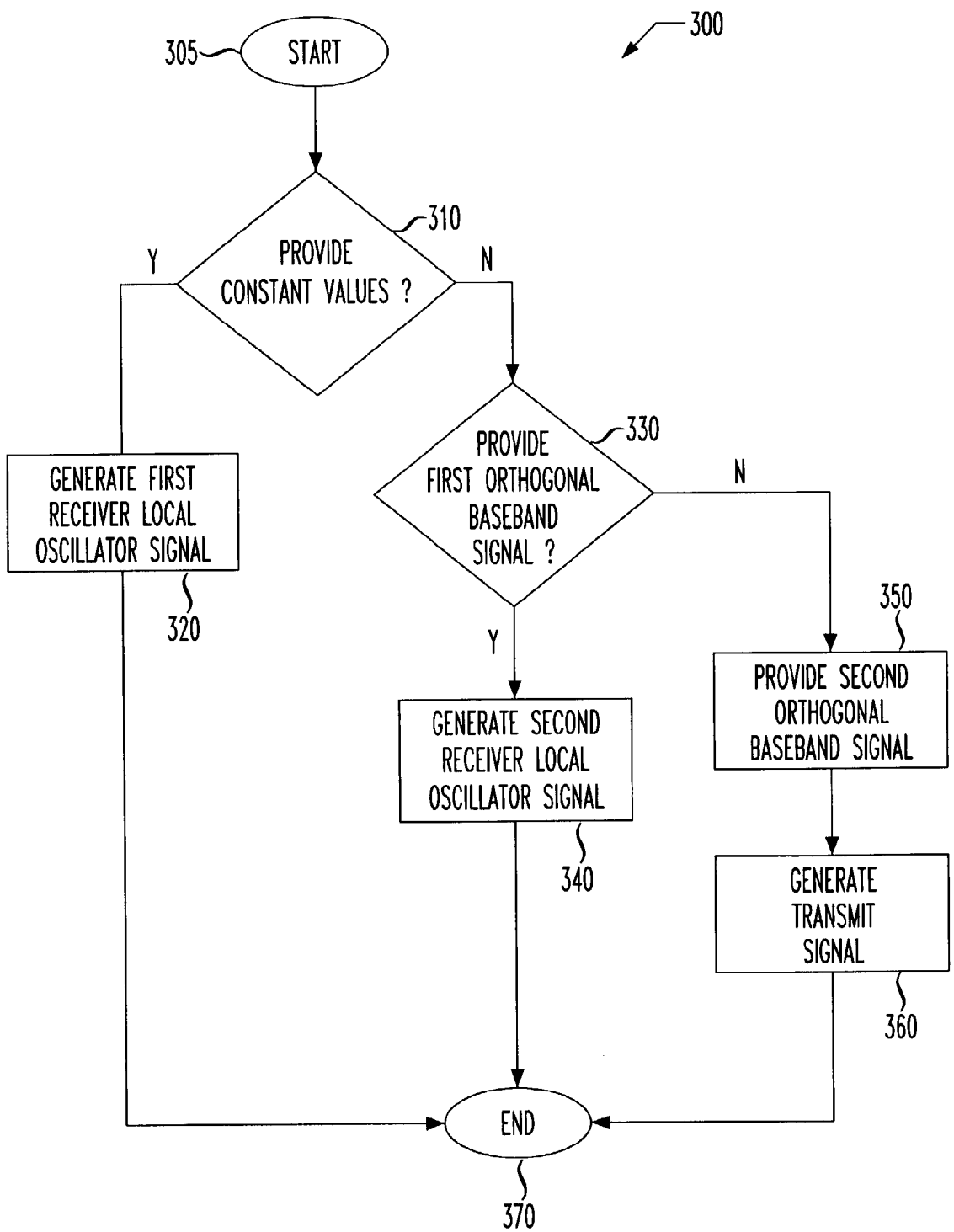
FIG. 3 illustrates a flow diagram of an embodiment of a method of operating a multimode local oscillator circuit constructed according to the principles of the present invention.

Turning now to FIG. 3, illustrated is a flow diagram of an embodiment of a method of operating a multimode local oscillator circuit, generally designated 300, constructed according to the principles of the present invention. The method starts in a step 305 with an intent to operate the multimode local oscillator circuit.

After determining to receive data, a determination is made to provide constant values in a first decisional step 310. The constant values may be, for example, a continuous high value and a continuous low value. A signal generator may provide the constant values to a first and second input of a single sideband mixer. The determination to provide constant values may be based on the receipt of data by an OFDM transceiver.

If constant values are provided, a first receiver local oscillator signal is generated in a step 320. The single sideband mixer may generate the first receiver local oscillator signal for operating the OFDM transceiver as a zero intermediate frequency receiver. After generating the first receiver local oscillator signal, operating a multimode local oscillator circuit ends in a step 370.

Returning now to the first decisional step 310, if constant values are not provided, then a determination is made to provide a first orthogonal baseband signal in a step 330. The first orthogonal baseband signal may be a sine or a square wave and may be generated by the signal generator. The I and Q components of the first orthogonal baseband signal may be provided to the first and second inputs of the single sideband mixer.

After providing a first orthogonal baseband signal, a second receiver local oscillator signal is generated in a step 340. The second receiver local oscillator signal may be generated by the single sideband mixer for operating the OFDM transceiver as a low intermediate frequency receiver. After generating the second receiver local oscillator signal, the method proceeds to step 370 and ends.

Returning now to the second decisional step 330, if a first orthogonal baseband signal is not provided, then a second orthogonal baseband signal is provided in a step 350. The second orthogonal baseband signal may be a sinewave or a square wave of data that is to be transmitted. In a preferred embodiment, the second orthogonal baseband signal is provided by a transmitting data processor and by-passed by the signal generator to the first and second inputs of the single sideband mixer.

After providing the second orthogonal baseband signal, a transmit signal is generated in a step 360. After generating a transmit signal, the method ends in the step 370.

While the methods disclosed herein have been described and shown with reference to particular steps performed in a particular order, it will be understood that these steps may be combined, subdivided, or reordered to form an equivalent method without departing from the teachings of the present invention. Accordingly, unless specifically indicated herein, the order and/or the grouping of the steps are not limitations of the present invention.

Although the present invention has been described in detail, those skilled in the art should understand that they can make various changes, substitutions and alterations herein without departing from the spirit and scope of the invention in its broadest form.

What is claimed is:

1. For use in an orthogonal frequency division multiplexing (OFDM) transceiver, a multimode local oscillator circuit, comprising:

a single sideband mixer having an output, first and second inputs and a local oscillator input; and a signal generator, coupled to said single sideband mixer, for alternatively providing to said first and second inputs:

constant values to cause said single sideband mixer to generate a first receiver local oscillator signal for operating said OFDM transceiver as a zero intermediate frequency receiver, and a first orthogonal baseband signal to cause said single sideband mixer to generate a second receiver local oscillator signal for operating said OFDM transceiver as a low intermediate frequency receiver.

2. The circuit as recited in claim 1 wherein said signal generator alternatively provides to said first and second inputs a second orthogonal baseband signal to generate a transmit signal for operating said OFDM transceiver as a transmitter.

3. The circuit as recited in claim 1 wherein said single sideband mixer comprises first and second phase offset circuits, coupled to said local oscillator input, for generating first and second orthogonal local oscillator signals.

4. The circuit as recited in claim 1 further comprising a mode switch, coupled to said output, for toggling said OFDM transceiver between receiver and transmitter modes.

5. The circuit as recited in claim 1 wherein said first orthogonal baseband signal is a wave selected from the group consisting of:

a sinewave, and a square wave.

6. The circuit as recited in claim 1 wherein said OFDM transceiver comprises a second single sideband mixer for receiving one of said first and second receiver local oscillator signal when said OFDM transceiver is operating as said receiver.

7. The circuit as recited in claim 1 wherein said OFDM transceiver and said a multimode local oscillator circuit are embodied in a single integrated circuit.

8. For use in an orthogonal frequency division multiplexing (OFDM) transceiver, a method of operating a multimode local oscillator circuit, comprising:

providing constant values to first and second inputs of a single sideband mixer to cause said single sideband mixer to generate a first receiver local oscillator signal at an output thereof for operating said OFDM transceiver as a zero intermediate frequency receiver, and alternatively providing a first orthogonal baseband signal to said first and second inputs to cause said single sideband mixer to generate a second receiver local oscillator signal for operating said OFDM transceiver as a low intermediate frequency receiver.

9. The method as recited in claim 8 further comprising alternatively providing a second orthogonal baseband signal to said first and second inputs to cause said single sideband mixer to generate a transmit signal for operating said OFDM transceiver as a transmitter.

10. The method as recited in claim 8 further comprising generating first and second orthogonal local oscillator signals with first and second phase offset circuits.

11. The method as recited in claim 8 further comprising toggling said OFDM transceiver between receiver and transmitter modes.

12. The method as recited in claim 8 wherein said first orthogonal baseband signal is a wave selected from the group consisting of:

a sinewave, and a square wave.

13. The method as recited in claim 8 further comprising employing a second single sideband mixer in said OFDM transceiver for receiving one of said first and second receiver local oscillator signal when said OFDM transceiver is operating as said receiver.

14. The method as recited in claim 8 wherein said method is carried out in a single integrated circuit.

15. An orthogonal frequency division multiplexing (OFDM) transceiver, comprising:
    signal demodulating circuitry including at least one filter;
    a multimode local oscillator circuit, coupled to said signal demodulating circuitry and including:
        a single sideband mixer having an output, first and second inputs and a local oscillator input, and
        a signal generator, coupled to said single sideband mixer, for alternatively providing to said first and second inputs:
            constant values to cause said single sideband mixer to generate a first receiver local oscillator signal for operating said OFDM transceiver as a zero intermediate frequency receiver, and
            a first orthogonal baseband signal to cause said single sideband mixer to generate a second receiver local oscillator signal for operating said OFDM transceiver as a low intermediate frequency receiver.

16. The OFDM transceiver as recited in claim 15 wherein said signal generator alternatively provides to said first and second inputs a second orthogonal baseband signal to cause said single sideband mixer to generate a transmit signal for operating said OFDM transceiver as a transmitter.

17. The OFDM transceiver as recited in claim 15 wherein said single sideband mixer comprises first and second phase offset circuits, coupled to said local oscillator input, for generating first and second orthogonal receiver local oscillator signals.

18. The OFDM transceiver as recited in claim 15 further comprising a mode switch, coupled to said output, for toggling said OFDM transceiver between receiver and transmitter modes.

19. The OFDM transceiver as recited in claim 15 wherein said first orthogonal baseband signal is a wave selected from the group consisting of:
    a sinewave, and
    a square wave.

20. The OFDM transceiver as recited in claim 15 wherein signal demodulating circuitry comprises a second single sideband mixer for receiving one of said first and second receiver local oscillator signal when said OFDM transceiver is operating as said receiver.

21. The OFDM transceiver as recited in claim 15 wherein said OFDM transceiver and said multimode local oscillator circuit are embodied in a single integrated circuit.

* * * * *